I. A. POWELL.
Water-Heater.
No. 218,313. Patented Aug. 5, 1879.
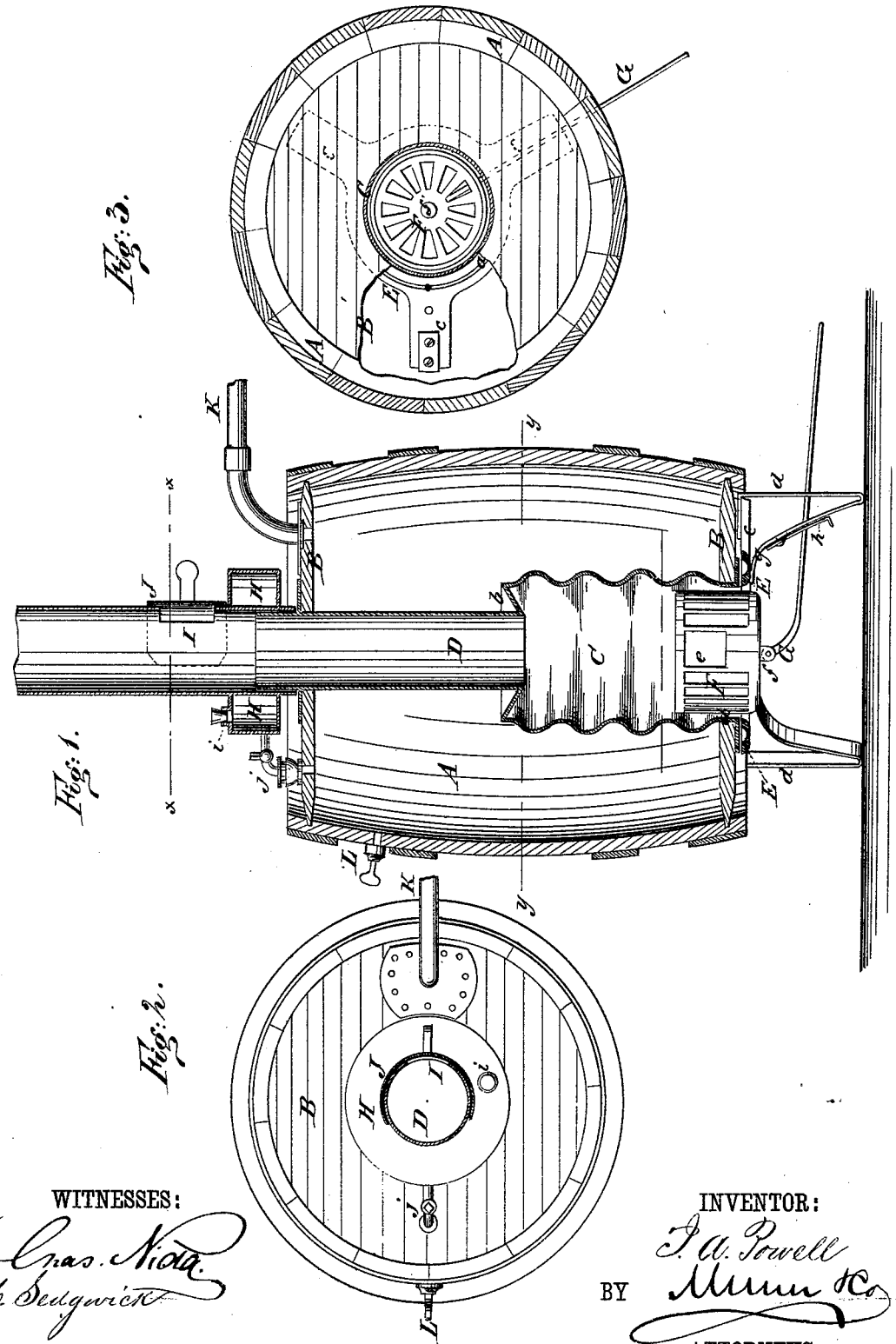
WITNESSES:
Chas. Niola
C. Sedgwick
INVENTOR:
I. A. Powell
BY Munn & Co
ATTORNEYS.

UNITED STATES PATENT OFFICE.

ISAAC A. POWELL, OF ELK FALLS, KANSAS.

IMPROVEMENT IN WATER-HEATERS.

Specification forming part of Letters Patent No. 218,313, dated August 5, 1879; application filed March 31, 1879.

*To all whom it may concern:*

Be it known that I, ISAAC A. POWELL, of Elk Falls, in the county of Elk and State of Kansas, have invented a new and Improved Water-Heater, of which the following is a specification.

This invention relates to improvements in the construction and arrangement of apparatus for heating water for steaming feed, scalding hogs, and for laundry purposes; and it has for its objects to increase the heating-surface of the apparatus, to facilitate the management of the fire-basket, and to supply heated water to the water-chamber, and thus avoid cooling off the hot water when a fresh supply is introduced.

The invention will be first described in connection with the drawings and then specifically pointed out in the claims.

In the accompanying drawings, Figure 1 is a vertical section of my improvement. Fig. 2 is a top plan or view of the same with part in section on line $x\ x$, and Fig. 3 is a horizontal section on line $y\ y$.

Similar letters of reference indicate corresponding parts.

Referring to the drawings, A represents the water-chamber, made of wood or iron, circular, or of any other convenient shape, having a top, B, and bottom B'.

From the bottom over a central opening, $a$, rises the fire-chamber C to any height where it is not liable to become uncovered by drawing off the water. The sides of this fire-chamber are corrugated for the purpose of increasing the heating-surface without increasing its height beyond a safe point, and its top is covered by a concave or inverted conical crown, $b$, from which rises the flue-pipe D, and this is carried through the top B of the water-chamber to a proper height above for obtaining the requisite draft, and to carry off the smoke and sparks.

Thus far there is no novelty to which I make any claim.

On the under side of the bottom B', around the opening $a$, is placed a collar, E, with radial arms $c$, to which are attached the supporting-legs $d$, which support the apparatus the requisite height above the ground.

F is the grated fire-basket, adapted to fit into the opening $a$, and up into the fire-chamber, as in Fig. 1, and having an opening, $e$, on one side for supplying fuel to the fire without removing the basket entirely from the fire-chamber.

In the bottom of the fire-chamber, at the center, is a pivot, $f$, the outer projecting end whereof is pivoted to the end of lever G, the arm whereof is passed through an opening in one of the legs $d$, which serves as a fulcrum for it.

The bracket or stay $g$ of the leg $d$, through which the lever is passed, is provided with a vertical slot for the lever, and a hook, $h$, for holding the lever up when the fire-basket is in the fire-chamber.

By means of lever G the fire-basket can be lowered from the fire-chamber to have the fuel replenished or to have the fire shaken up and to have the basket cleaned out and the fire kindled, thus greatly facilitating the management of the fire, and enabling it to be attended to without interfering with the water and fire chamber or the operations depending upon them.

When the fuel only needs replenishing, the fire-basket can be partially lowered from the chamber, so as to enable it to be put through the opening $e$. When the basket is to be lowered partially or entirely from the fire-chamber the arm of the lever must be released entirely from the hook $h$, which serves to retain the basket in the chamber.

Around the flue-pipe, just above the top of the water-chamber, is placed an annular water-chamber, H, with an inlet, $i$, and a tube, $j$, leading down through the top B to the interior of the water-chamber.

An opening, I, is made in the flue-pipe above annular chamber H, and over this is placed a sliding shield or door, J, by which the opening can be entirely or partially closed, and thus the draft can be properly regulated.

K represents the steam-nozzle, and L the water-gage, for indicating the height of the water in chamber A.

Having thus described my invention, I claim as new and desire to secure by Letters Patent—

The fire-chamber C and basket F, the latter provided with opening c, made separate from the fire-chamber, and adapted to be lowered partly or entirely out of it, in combination with a lever, G, as and for the purpose specified.

ISAAC A. POWELL.

Witnesses:
R. R. ROBERTS,
F. S. OLNEY.